United States Patent [19]
Derviller

[11] Patent Number: 5,199,526
[45] Date of Patent: Apr. 6, 1993

[54] LIGHTWEIGHT HIGH PERFORMANCE ROAD RACING VEHICLE

[76] Inventor: Peter R. J. Derviller, #35, 185 Woodridge Drive, S.W., Calgary, Alberta, Canada, T2W 3X7

[21] Appl. No.: 707,033

[22] Filed: May 29, 1991

Related U.S. Application Data

[63] Continuation-in-part of Ser. No. 410,468, Sep. 21, 1989, abandoned.

[51] Int. Cl.$^5$ .............................................. B60K 5/04
[52] U.S. Cl. ..................... 180/297; 180/357; 280/690; 280/756
[58] Field of Search ............... 180/297, 299, 350, 357, 180/358, 366; 280/690, 698, 701, 756

[56] References Cited

U.S. PATENT DOCUMENTS

| | | | |
|---|---|---|---|
| 794,666 | 7/1905 | Davin | 180/297 X |
| 1,401,797 | 12/1921 | Landini | 180/297 |
| 2,152,573 | 3/1939 | Turner | 180/291 |
| 2,980,196 | 4/1961 | Van Der Brugghen | 180/357 |
| 3,799,283 | 3/1974 | Freber | 180/56 |
| 4,362,221 | 12/1982 | Manning | 180/297 X |
| 4,425,976 | 1/1984 | Kimura | 180/56 |
| 4,799,565 | 1/1989 | Handa et al. | 180/69.4 |
| 4,811,812 | 3/1989 | Cassese | 180/299 X |

FOREIGN PATENT DOCUMENTS

| | | | |
|---|---|---|---|
| 374181 | of 0000 | France | 180/357 |
| 311243 | 9/1933 | Italy | |

OTHER PUBLICATIONS

Autocar, "Aeronautical Intrusion", Jul. 1, 1955.

Primary Examiner—Margaret A. Focarino
Assistant Examiner—Michael Mar
Attorney, Agent, or Firm—Ridout & Maybee

[57] ABSTRACT

A small and ultralightweight vehicle, especially for automobile racing, is provided having a driver's cockpit laterally offset from the vehicle's longitudinal axis; an engine laterally oppositely offset from the vehicle's longitudinal axis, laterally adjacent the cockpit; a transverse drive shaft from the engine to the primary drive along the longitudinal axis of the vehicle; and a final drive fixed to the center of a symmetric independently suspended rear axle. The rear axle comprises a central shaft and two outer swing shafts such that each rear wheel is fully independently suspended through use of suspension arms, springs and shock absorbers. The chassis comprises a welded tubular aluminum space frame and is outwardly clad with body panels. The engine, gear box and clutch are of motorcycle engine design having a lateral power takeoff shaft. In a preferred embodiment the vehicle is constructed in modules wherein the power module comprises: the rear portion of the space frame; the laterally mounted engine; rear wheels and axle; power train; rear wheel suspension and the rear portion of the cockpit roll cage.

11 Claims, 3 Drawing Sheets

LIGHTWEIGHT HIGH PERFORMANCE ROAD RACING VEHICLE

This application is a continuation-in-part of U.S. Ser. No. 410,468, filed Sep. 21, 1989, now abandoned.

This invention relates to a motor vehicle; particularly, an extremely compact ultralightweight one person racing vehicle having an engine laterally adjacent the driver's cockpit.

In the sport of automobile racing, vehicle designs range from high cost professional race cars to low cost amateur go-karts. The present invention incorporates design features of professional race cars while maintaining a moderate cost, primarily through the use of standard motorcycle engines, a relatively reduced vehicle size and weight as well as a novel power transmission and drive train configuration. The present invention provides a degree of safety performance, and handling, heretofore unavailable in a low cost vehicle, which is easily maintained, transported, and stored, all primarily due to the reduction in size and lateral mounting of the engine, drive line, chassis and rear suspension components in a way which yields the smallest possible vehicle cross sectional area and envelope but retains a full size cockpit. Conventional professional race cars may be classified according to the engine location, namely forward engine, rear engine, and mid-engine vehicles. Most high performance high cost race cars are of the mid-engine or rear engine type due to superior handling, cornering and maneuvering as a result of weight distribution and aerodynamic efficiency, such as, for example, Indy and Formula One race cars.

Forward engine race cars include stock cars and cross-country rally cars. Stock cars and rally cars comprise: a standard production automobile chassis and body often modified to increase its structural strength and to reduce wind resistance; a modified high performance automobile engine and power transmission; driver safety equipment; and modified vehicle controls. Since stock and rally cars are essentially passenger vehicles modified for racing, their costs are within the means of many amateurs, but their designs as passenger cars limits racing performance due to wind drag resistance, low power to weight ratio, relatively high centre of gravity and forward weight distribution, which are disadvantages well known to those skilled in the art.

Low cost motorized go-kart vehicles are popular with racing enthusiasts of more limited means. An example of such a vehicle is disclosed in U.S. Pat. No. 3,799,283 to Freber. The design of go-karts is primitive by racing standards, although performance may be acceptable due to high power to weight ratios. Widespread acceptance has been limited due to the lack of independent wheel suspension, little or no body work, lack of driver safety features, and poor aerodynamic properties. In addition, the driver of a go-kart appears out of proportion with such a vehicle, providing the overall impression that a go-kart is a toy, not intended for serious racing, although speeds of up to 150 mph are not uncommon.

One or two engines may be used in go-karts which may be side mounted adjacent the driver. Power is transmitted from a go-kart engine to a one-piece transverse rear axle via a chain or belt to a sprocket or sheave mounted inwardly adjacent one rear wheel. In order to maintain the alignment of the chain and sprockets in an operating plane, go-kart vehicles such as disclosed in the Freber patent have frames which flex as the wheels ride over bumps and hollows. The go-kart engine experiences the same impact loads and vibrations experienced by the go-kart rear wheels and axles. Such a suspension design therefore is limited to lightweight vehicles driven over smooth surfaces. High speed go-kart driving on generally bumpy tracks requires a high degree of skill and physical stamina due to the rough ride, and unpredictable handling of such vehicles.

In order to realize the benefits of a smaller race car, several attempts have been made to develop a workable design; in particular, the early Cooper 500 and the contemporary Formula 440. The Formula 440 is an open wheel vehicle powered by a 440 cc snowmobile engine. In both the Cooper 500 and Formula 440, the engine is located behind the driver and forward of the rear axle. The disadvantage of locating the engine in this position is that the average driver cannot recline in the cockpit, which is preferred aerodynamically and aesthetically, without extending the vehicle's wheel base dimension or projecting the driver's feet dangerously ahead of the front wheels. Use of a compact engine in such vehicles to address this problem is only partially satisfactory, since the engine location restricts the designer in minimizing the vehicle's length. A reduction of overall length permits a corresponding reduction in width, hence a smaller envelope yielding lower aerodynamic drag and reduced structural weight. In rear engined vehicles, the smaller the physical size of the engine, the smaller can be the car; however, the smaller the car's engine, the lower its engine power output, and hence, the car's performance is lower. Conversely, the larger the physical size of the rear mounted engine, the larger will be the car because an increase in length dictates an increase in width. The present invention de-couples the relationship between engine size (and hence car performance) and vehicle envelope size which is a characteristic of conventional designs.

In order to reduce a vehicle's longitudinal dimension, several automobiles have been designed which incorporate an engine laterally offset from the longitudinal axis of the vehicle, specifically as shown in U.S. Pat. Nos. 1,401,797 to Landini and 2,152,573 to Turner, Italian Patent No. 311243 (priority from British Patent 380670 18 Dec. 1931) and a journal article dated 1 Jul. 1955, the Autocar pgs. 7–8. Power transmission means disclosed in the above references consist of longitudinal drive shafts with ring and pinion, and longitudinal sprocket and chain means. The power transmission means generally engages a one-piece live rear axle, at a position offset from the vehicle's longitudinal axis, often immediately adjacent one rear wheel. Such a rear axle and offset final drive design adds weight and consumes space adjacent the rear wheel, effectively precluding the use of a state of the art fully independent suspension. The resultant disparity between the length of axle through which torque is transmitted to the two rear wheels, combined with the unbalanced weight of the offset power transmission means upon the rear axle, results in unequal drive wheel reaction, unequal rear wheel suspension loads, and erratic handling. The vehicle disclosed in U.S. Pat. No. 2,152,573 to Turner achieves independent rear drive wheel suspension through the use of dual power longitudinal transmission means laterally offset from the vehicle's longitudinal axis, and dual rear axles driven by one or two laterally offset engines.

The above mentioned disadvantages of the offset transmission means of conventional vehicles having side mounted engines, inhibits the performance of such vehicles in competitive high speed automobile road racing, and may partially explain their apparent lack of commercial success.

The present invention relates to a novel lightweight, high performance road racing vehicle which overcomes one or more of the disadvantages of the vehicles having side mounted engines described above, and simultaneously meets the objective of fitting into the vehicle an engine being approximately 100% larger in physical size and power output than the maximum engine size possible for use in a rear engine mounted vehicle with the same cockpit size, wheelbase, track and height.

A vehicle is herein disclosed which incorporates many features of high cost professional race cars in a vehicle of moderate cost. A vehicle in accordance with the present invention, therefore, has the general appearance and performance previously only available in relation to professional race cars but is of substantially smaller dimensions and lesser weight primarily due to the lateral positioning of a high power-to-weight ratio engine, and the unique arrangement of the power transmission means in relation to the driver's seat, rollover structure and rear suspension. The visual effect of the vehicle, the subjective impression of the driver while in the reclining position and the nature of the vehicle handling overcome major obstacles to the widespread acceptance of smaller race cars, namely, the perception that go-karts and other small, lightweight vehicles are toys rather than serious but economical racing vehicles. A primary motivation behind many sporting enthusiasts, including racing fans, is the image projected by the athlete or sportsman. The overall impression of a vehicle according to the present invention, therefore, is a significant factor in the market acceptance of the vehicle.

In accordance with the invention there is provided a lightweight, high performance racing vehicle, comprising a chassis having a central longitudinal axis, and a driver's cockpit configured to allow the driver to assume a reclining position and being laterally offset from the longitudinal axis. An engine is located laterally oppositely offset from the longitudinal axis adjacent the cockpit, and power transmission means extend transversely from the engine to the longitudinal axis and along it to the centre of a transverse symmetric independently suspended rear axle, the entire assembly being positioned in the chassis to produce the closest possible physical proximity between its component parts, and thus, achieving superior competitive performance by virtue of the resulting small cross sectional area and envelope of the vehicle.

Figure 1:
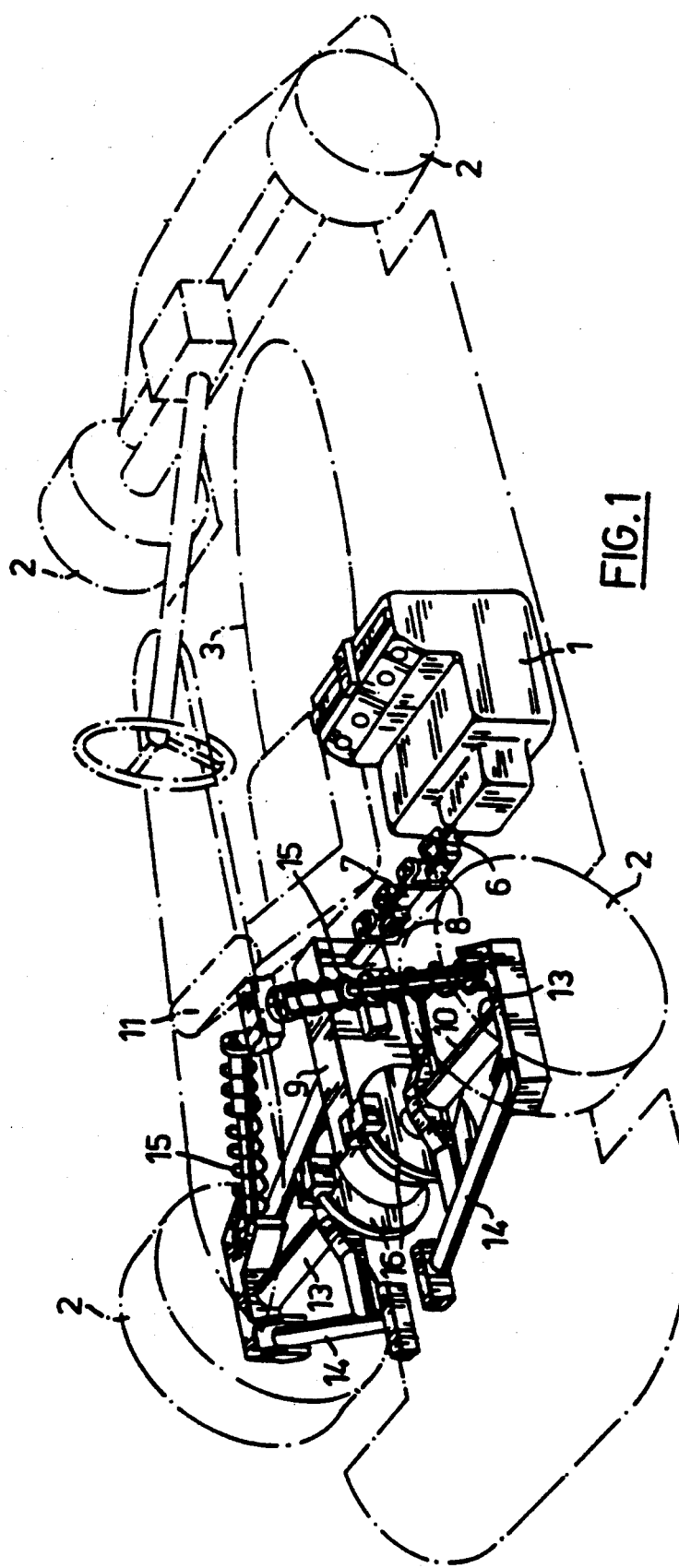
FIG. 1 is a perspective view of a vehicle showing the engine, power transmission and rear axle with the vehicle's other components outlined.

In the embodiment of the invention illustrated in the drawings, a vehicle chassis is constructed of welded aluminum tubes forming a space frame structure. The skilled person will appreciate that the vehicle chassis also can be constructed of steel tubes or composite reinforced plastic. In addition to housing the drive train and other automotive components, the chassis structure envelopes the driver in an integral structural roll cage surrounding the driver's cockpit. The driver is therefore safely contained within the structure in a reclining position which is preferred aerodynamically and aesthetically. The vehicle's body is constructed of body panels, comprising molded FRP using carbon fiber, Kevlar ® or fiberglass and resin bonding, which are riveted or otherwise fastened to the chassis. The structural diaphragm action of the attached body panels compositely reinforces the chassis structure. Nose, tail and cockpit fairings are molded of lightweight plastic. Underbody aerodynamic air ducting is provided to enhance the vehicle's stability, and to cool the engine and transmission. Through an intake nose fairing air passes through longitudinal ducting located in the vehicle's underbody. Cooling air is directed from openings in the side of the vehicle. Air then passes under the compartment housing the longitudinal transmission means and out the rear of the vehicle. Together with underbody aerodynamic ducting, the outer body and chassis described above incorporates the aerodynamic design features and lightweight structure of conventional professional race cars.

Figure 2:
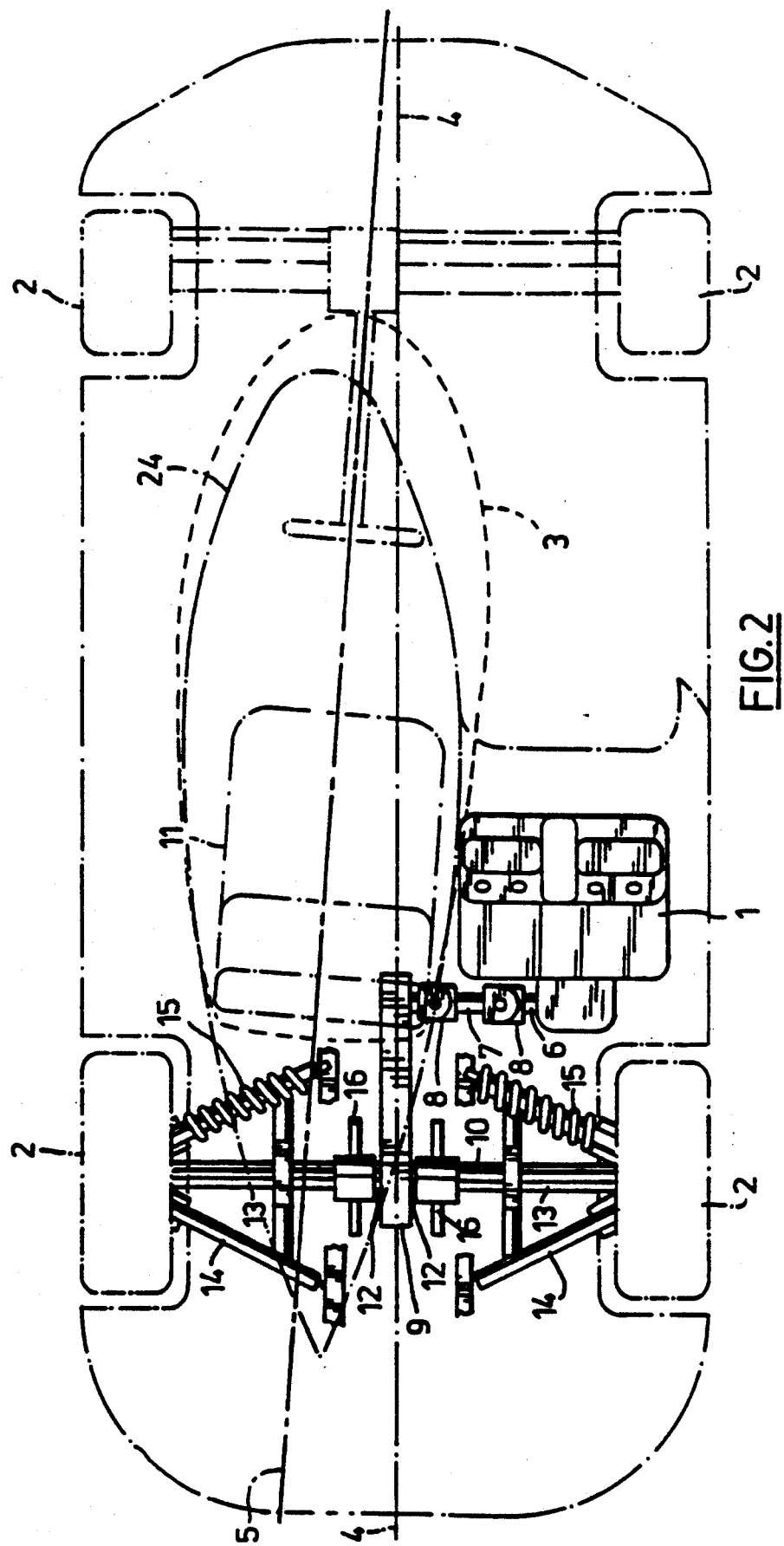
FIG. 2 is a plan view of a vehicle showing the driver's cockpit offset from the vehicle's longitudinal axis.

Referring to FIG. 2, the vehicle's engine 1 is mounted in the chassis, preferably being located within a rectangular plane defined by the axial centres of the four wheels 2. As shown in FIG. 2, the engine, gear box and clutch are combined in a single compact unit, as is conventional for motorcycle engines. Referring to FIG. 2, the engine 1 is mounted rearward of the vehicle's wheelbase centre for reasons of improved traction and handling well known to those skilled in the art. The driver's cockpit 3 is mounted laterally offset from the longitudinal axis 4 of the chassis. The engine 1 is also laterally adjacent the cockpit 3. The relative offset dimensions of the cockpit 3 and engine 1 are such that the weight of the driver and the weight of the engine 1 exert approximately equal and opposite moments about the longitudinal axis 4, thereby maintaining vehicular balance.

As shown in FIG. 2, the driver's cockpit longitudinal centre line 5 is angularly offset from the longitudinal axis 4 of the vehicle such that the cockpit's lateral offset increases rearwardly. The degree of angular offset may vary with engine 1 dimensions; however, the angular offset in any case is insignificant in respect of vehicle handling and driver comfort and is only necessary to minimize the vehicle's width. In order to accommodate the forward suspension, brakes and steering, as well as the driver's forward cockpit 3, while maintaining minimal vehicular width, it is preferable to position the forward portion of the cockpit 3 centrally. To accommodate the engine rearwardly, therefore, the cockpit centre line 5 may be set at an angle rearwardly increasing the lateral offset dimension. Although the cockpit 3 may be positioned with its longitudinal centre line 5 angularly offset, the outer cockpit fairing 24 has its longitudinal centre line parallel to the vehicle's longitudinal axis 4 to minimize wind resistance.

The engine 1 is preferably a conventional motorcycle engine having a lateral power takeoff shaft 6. A transverse drive shaft 7 connected to the engine power takeoff shaft 6 extends to the longitudinal axis 4. In the particular embodiment shown, the transverse drive shaft 7 engaging the engine takeoff shaft 6 includes two universal joints 8 on each side of a splined slip joint.

Power transmission means 9 are provided in a vertical plane along the vehicle's longitudinal axis 4 from the transverse drive shaft 7 to the centre of the transverse symmetric independently suspended rear axle 10.

The longitudinal power transmission means 9 in one embodiment of the invention, comprises: a primary drive sprocket fixed to the inner end of the transverse drive shaft 7; a final drive sprocket fixed to the centre of the rear axle 10; and a closed loop chain engaging the primary and final drive sprockets. The chain and sprockets are aligned in a vertical plane along the vehicle's longitudinal axis 4. It is particularly advantageous to enclose the chain and sprockets in an oil filled housing which has annular oil seals about the openings through which the rear axle 10 and transverse drive shaft project 7. Use of such a housing ensures complete chain lubrication reducing friction, reducing chain and sprocket abrasion since sand and other solid particles are not exposed to the lubricating oil, and protecting the vehicle's interior from lubricant and damage in the event of chain failure. In addition, the chain housing protects the driver in case of chain failure.

In another embodiment, the longitudinal power transmission means 9, comprises: a primary drive sheave fixed to the inner end of the transverse drive shaft 7; a final drive sheave fixed to the centre of the rear axle 10; and a closed loop belt engaging the primary and final drive sheaves. The belt and sheaves are aligned in a vertical plane along the vehicle's longitudinal axis 4.

Referring to FIG. 2, in order to minimize the vehicle's length and therefore its weight, at least the forward portion of the power transmission means 9, along the longitudinal axis 4, is located under the rearward end of the driver's cockpit 3. A partially reclining driver rests upon a seat within the cockpit, the rearwardmost portion of which is upwardly rearwardly inclined to support the driver's back and head.

The rear wheels 2 of the vehicle are fully independently suspended from the chassis. The rear axle 10, comprises: a central shaft 12 journalled in the chassis and engaging the power transmission means 9 along the vehicle's longitudinal axis 4; and two outer swing shafts 13 articulately rotatably connected at their inner ends to the outer ends of the central shaft 12 and to a vehicle wheel 2 at their outer ends. In the embodiment illustrated, the swing shafts 13 each are rotatably supported by an independent suspension arm 14. The suspension arms 14 are pivotably connected at their inner ends to a lower portion of the chassis 11 and are connected at their outer ends, via extendable and retractable impact absorbing means 15 to an upper portion of the chassis. Optionally, dual upper and lower wishbone-shaped or A-shaped rear suspension arms may be used to rotatably support the swing shafts 13. In the embodiment shown in the drawings, the impact absorbing means 15 comprise coaxial coil springs and shock absorbers, but other well known means may be used to lesser advantage.

The swing axles 13 pivot in a transverse vertical plane about their inner ends and the rear vehicle wheels 2 are thereby fully independently suspended.

Rear disc brakes 16 are fixed to the central shaft 12 of the rear axles 10, outward of the power transmission means 9 and longitudinal axis 4 of the vehicle as shown in FIG. 1. The weight and therefore inertia of the rear wheels is reduced by positioning the disc brakes on the central shaft rather than adjacent the inner side of the rear wheels 2.

The forward suspension and steering of the vehicle are of conventional design.

Figure 3:
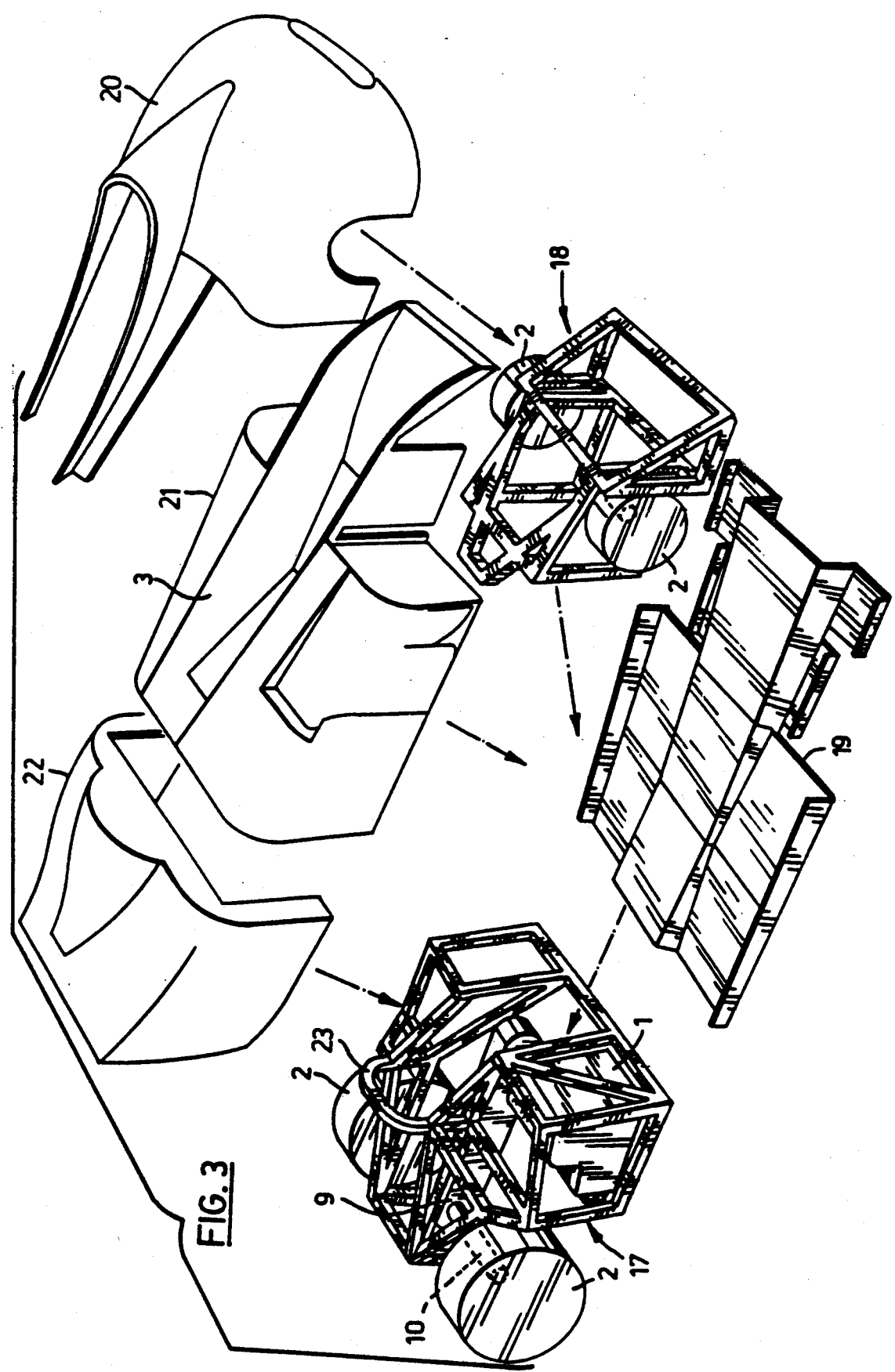
FIG. 3 is an exploded perspective view of the vehicle showing the modules of which it is constructed.

Referring to FIG. 3, a vehicle in accordance with the invention may be constructed of modules, comprising: the power module 17; the front-end module 18; the floor module 19; and body panels comprising: the nose panel 20; the cockpit panel 21; and the tail panel 22. The front-end module 18, housing the front wheels 2, the steering and the front suspension, is assembled prior to connection to the floor module 19. Likewise, the power module 17 is assembled, then connected to the floor module 19. The floor module 19 is connected to the front-end module 18 to complete the chassis structure. The power module 17 comprises a rearward portion of the vehicle's chassis housing the engine 1, the power transmission means 9, the rear axle 10 and rear wheels 2, and the rear suspension system (previously described). The rearward portion of the vehicle's chassis also includes a roll bar 23 and supports the rearward portion of the driver's cockpit 3 within the chassis structure. The power module 17 may be manufactured such that it is adaptable to a variety of chassis designs.

The preferred embodiment described herein provides a lightweight, high performance racing vehicle capable of speeds in excess of 150 mph using a standard 1000 cc motorcycle engine. With engine modifications to increase the horsepower from about 130 to about 180, speeds approaching 200 mph may be obtained.

Typical dimensions of a racing vehicle of the invention are:

| | |
|---|---|
| wheelbase | 72 inches |
| width | 48 inches |
| length | 120 inches |
| height | 33 inches |

The cockpit will readily accommodate a driver of 6 feet 3 inches in height. As mentioned, the driver operates the vehicle from a reclining position.

The small size of the racing vehicle of the invention allows a reduction in the cross-sectional area of more than 27% when compared to a conventional racing vehicle, and this cross-sectional area reduction provides a marked reduction in aerodynamic drag. The small size of the vehicle of the invention also translates into a much lighter vehicle when compared to conventional race cars. The present racing vehicle weighs less than 1000 lbs with the driver aboard. Without the driver the vehicle weighs from about 600 lbs to about 750 lbs. Preferably, the vehicle without driver weighs no more than 650 lbs.

While a preferred lightweight, high performance road racing vehicle has been described herein, the foregoing is not intended to limit the scope of the invention to which the applicant is entitled at law pursuant to the following claims.

I claim:

1. A lightweight, high performance road racing vehicle, comprising:
    a chassis in which are mounted four wheels, said chassis having a central longitudinal axis and a power module;
    a driver's cockpit having a longitudinal center line and including a protective roll cage integrally constructed within the power module of the chassis, said roll cage having an internal portion for mounting a driver's seat therein with the seat being laterally offset from the central longitudinal axis on one side thereof, the cockpit being configured to allow the driver to assume a reclining position and wherein the longitudinal center line of the driver's cockpit is angularly offset from the central longitudinal axis of the vehicle such that the lateral offset of the cockpit increases rearwardly;

an engine within the power module of the chassis, the engine having a power takeoff shaft and being capable of powering the vehicle at racing speeds, the engine being mounted laterally offset from the central longitudinal axis on an opposite side thereof and laterally adjacent the seat, the relative offset of the seat and the engine being selected so that the weight of the driver and the weight of the engine exert approximately equal and opposite moments about the central longitudinal axis, thereby maintaining vehicular balance;

power transmission means within the power module of the chassis, said means comprising: a transverse drive shaft from the power takeoff shaft of the engine to the central longitudinal axis of the vehicle; a primary drive sprocket fixed to an inner end of the drive shaft; a final drive sprocket located rearwardly of the primary drive sprocket; and a closed loop chain engaging the primary and final drive sprockets and being aligned in a vertical plane extending along the central longitudinal axis; and a rear axle within the power module, the axle comprising: a central shaft journalled in the chassis and fixed to the final drive sprocket; two outer swing shafts articulately rotatably connected at their inner ends to respective outer ends of the central shaft and at their outer ends to respective rear wheels, each said swing shaft being rotatably supported adjacent its outer end by at least one independent suspension arm connected between each rear wheel and the chassis.

2. A racing vehicle in accordance with claim 1, wherein said chain and sprockets are enclosed in an oil filled housing having annular oil seals about the openings through which the rear axle and transverse drive shaft project.

3. A racing vehicle in accordance with claim 1, wherein the primary drive sprocket of the power transmission means is located rearward of the driver's seat.

4. A racing vehicle in accordance with claim 1, further comprising a pair of disc brakes fixed to the central shaft of the rear axle on respective sides of the central longitudinal axis.

5. A racing vehicle in accordance with claim 1, wherein the vehicle has a wheelbase of about 72 inches and a width of about 50 inches.

6. A racing vehicle in accordance with claim 1, wherein the vehicle weights from about 600 lbs to about 750 lbs.

7. A lightweight, high performance road racing vehicle, comprising:

a chassis in which are mounted four wheels, said chassis having a central longitudinal axis and a power module;

a driver's cockpit having a longitudinal center line and including a protective roll cage integrally constructed within the power module of the chassis, said roll cage having an internal portion for mounting a driver's seat therein with the seat being laterally offset from the central longitudinal axis on one side thereof, the cockpit being configured to allow the driver to assume a reclining position and wherein the longitudinal center line of the driver's cockpit is angularly offset from the central longitudinal axis of the vehicle such that the lateral offset of the cockpit increases rearwardly;

an engine within the power module of the chassis, the engine having a power takeoff shaft and being capable of powering the vehicle at racing speeds, the engine being mounted laterally offset from the central longitudinal axis on an opposite side thereof and laterally adjacent the seat, the relative offset of the seat and the engine being selected so that the weight of the driver and the weight of the engine exert approximately equal and opposite moments about the central longitudinal axis, thereby maintaining vehicular balance;

power transmission means within the power module of the chassis, said means comprising: a transverse drive shaft from the power takeoff shaft of the engine to the central longitudinal axis of the vehicle; a primary drive sheave fixed to an inner end of the drive shaft; a final drive sheave located rearwardly of the primary drive sheave; and a closed loop belt engaging the primary and final drive sheaves and being aligned in a vertical plane extending along the central longitudinal axis; and a rear axle within the power module, the axle comprising: a central shaft journalled in the chassis and fixed to the final drive sheave; two outer swing shafts articulately rotatably connected at their inner ends to respective outer ends of the central shaft and at their outer ends to respective rear wheels, each said swing shaft being rotatably supported adjacent its outer end by at least one independent suspension arm connected between each rear wheel and the chassis.

8. A racing vehicle in accordance with claim 7, wherein the primary drive sheave of the power transmission means is located rearward of the driver's seat.

9. A racing vehicle in accordance with claim 7, further comprising a pair of disc brakes fixed to the central shaft of the rear axle on respective sides of the central longitudinal axis.

10. A racing vehicle in accordance with claim 7, wherein the vehicle has a wheelbase of about 72 inches and a width of about 50 inches.

11. A racing vehicle in accordance with claim 7, wherein the vehicle weighs from about 600 lbs to about 750 lbs.

* * * * *